(12) United States Patent
Schnell et al.

(10) Patent No.: US 6,234,810 B1
(45) Date of Patent: May 22, 2001

(54) SMART CARD CONNECTOR

(75) Inventors: Thomas Schnell, Heilbronn; Gerhard Braun, Bitzfeld; Andreas Laage, Bietigheim, all of (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/504,888

(22) Filed: Feb. 16, 2000

(30) Foreign Application Priority Data

Feb. 16, 1999 (DE) ............................................... 199 06 399
Jun. 23, 1999 (DE) ............................................... 199 28 744

(51) Int. Cl.⁷ ...................................................... H01R 9/09
(52) U.S. Cl. ............................................................ 439/76.1
(58) Field of Search ................................... 439/630, 76.1, 439/326, 341, 342; 235/441

(56) References Cited

U.S. PATENT DOCUMENTS

| 5,269,707 | 12/1993 | Reichardt et al. | 439/630 |
| 5,718,609 | 2/1998 | Braun et al. | 439/630 |
| 5,813,878 | * 9/1998 | Kuwata et al. | 439/326 |
| 6,082,213 | * 7/2000 | Skogward | 74/473.18 |
| 6,095,868 | * 8/2000 | Hyland et al. | 439/630 |

FOREIGN PATENT DOCUMENTS

| 36 42 424 | 6/1987 | (DE) . |
| 0 472 692 | 3/1991 | (EP) . |
| 0 494 503 | 11/1991 | (EP) . |
| 0 840 246 | 10/1997 | (EP) . |

* cited by examiner

Primary Examiner—Renee Luebke
Assistant Examiner—Phuong Chi Nguyen
(74) Attorney, Agent, or Firm—Blank Rome Comisky & McCauley, LLP

(57) ABSTRACT

SIM-card connector having a cover disposed on a contact support for pivotal movement about a pivoting axis, wherein said pivoting axis is displaced towards the front to reduce the longitudinal dimension, and an optimized roll off geometry recessed in the contact support is provided.

21 Claims, 7 Drawing Sheets

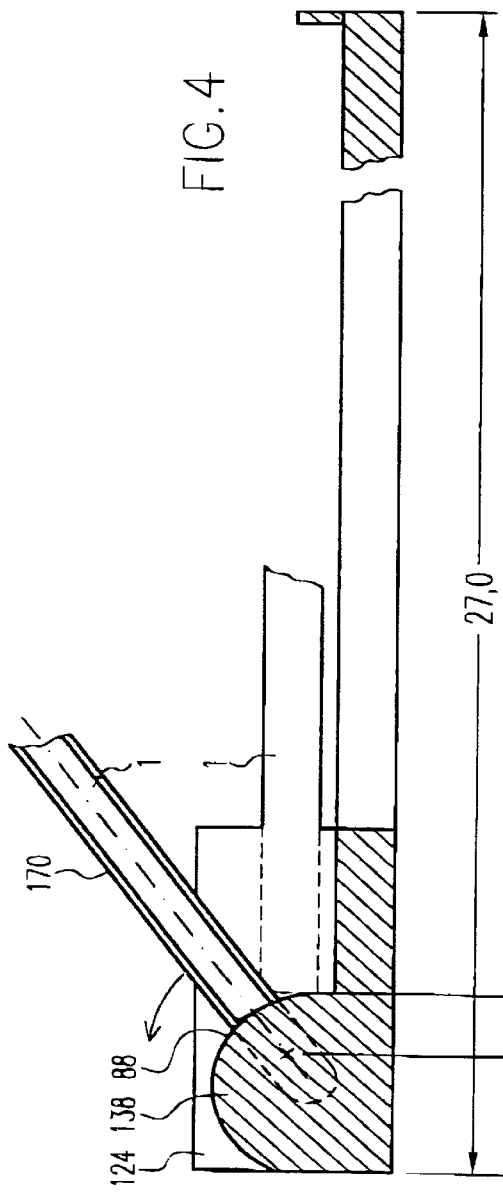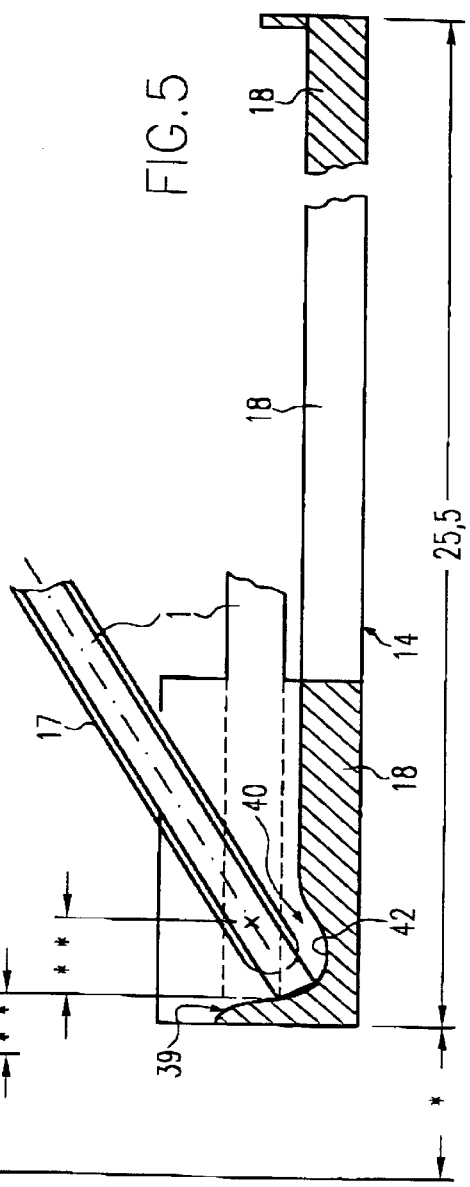

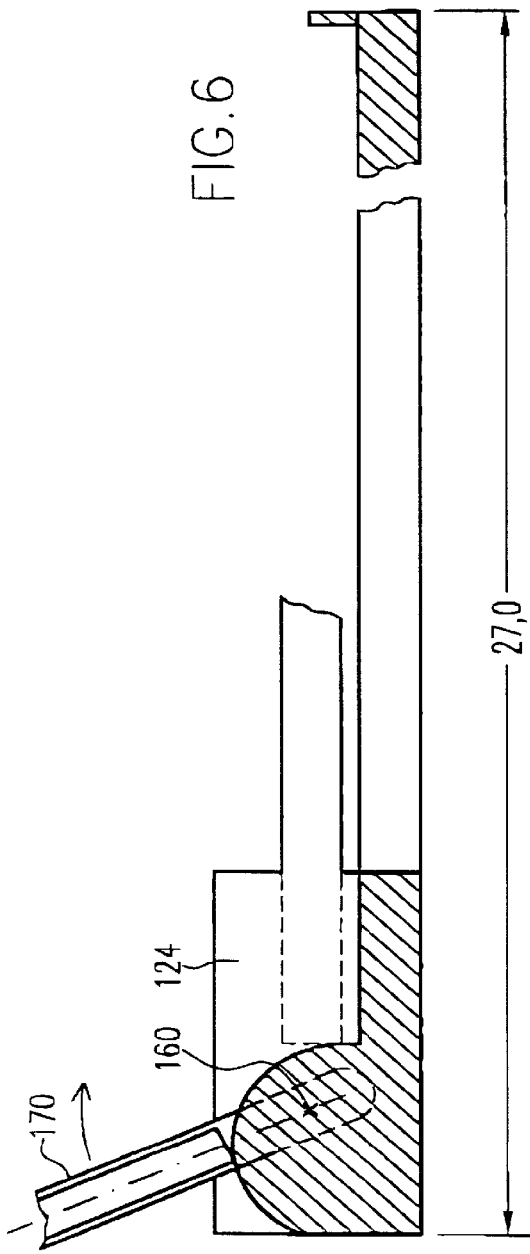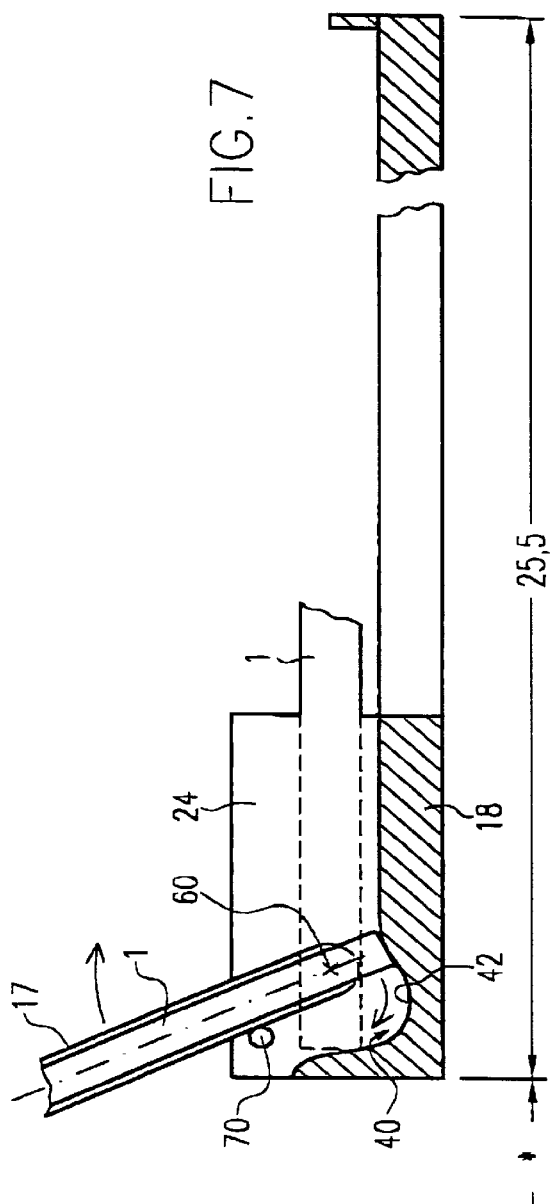

SMART CARD CONNECTOR

TECHNICAL FIELD

The present invention relates to a smart-card connector and in particular to a SIM-card connector comprising a contact support on which a cover is supported for a pivotal movement about a pivoting axis, said cover receiving the smart card or, in particular, the SIM-card. The smart-card, in particular the SIM-card is occasionally referred to below as a "card".

BACKGROUND OF THE INVENTION

From the DE 40 08 655 A1 a contacting apparatus or card connector, in particular for a SIM (subscriber identity module) card is already known, wherein the card, in particular the SIM-card is received in a cover and is supported at its rear edge by a supporting surface during the pivotal movement from an open position to a closed position. These SIM-card connectors are often used in devices such as mobile phones in which little or limited construction space is available. The desire for progressively smaller devices, as it is the case for example for mobile phones, makes it necessary to thrive for the further reduction of the size of the SIM-card connector which is to be inserted into such devices.

The card connector of DE 40 08 655 A1 is shown in cross section in FIG. 9. For receiving and guiding a SIM-card 1 in a cover 164, the cover 164 is provided with two guide projections 90 (only one of which is shown in FIG. 9). The projections 90 define—as is shown in FIG. 9—a tunnel, wherein oppositely located wall portions 92 provide for the guidance of the SIM-card at its side edges. A guiding means 140 comprises an abutment surface 88 at the contact support 63 which limits the depth of insertion of the SIM-card 1. When closing the cover 164 the SIM-card is rotated along the abutment surface 88 into a recess 78 of the contact support 63. The cover 164 also comprises a locking pin 89 for locking the closed cover. A pivot point 65 for pivotally supporting the cover 164 on the contact support 63 is provided on supporting blocks 124 and is located further to a rearward direction (towards the left in FIG. 9) of the contact support in comparison to the abutment surface 88.

A modification of the connector of the prior art is shown in FIGS. 4 and 6, where the abutment surface 88 is formed by an abutment shoulder 138 having a semicircular shape. A pivoting axis 160 for the cover 170 is defined at the supporting blocks 124 for supporting the cover 170 on the contact support in a similar fashion as the cover 164 is supported by the pivot points 65 in FIG. 9. When moving the cover 170 together with the inserted SIM-card 1 from its open position to its closed position, a rear edge of the SIM-card 1 is guided by the abutment surface 88 along a semicircular path or curve.

SUMMARY OF THE INVENTION

The present invention has realized that by displacing the pivoting axis of the cover, in particular in connection with an optimized guiding geometry which is formed in a recessed manner in the contact support, there can be obtained, in particular, a reduced longitudinal dimension.

In accordance with the invention a smart-card connector, in particular a SIM-card connector is provided in which a contact support supporting contacts comprises a recess or groove in its upper or top surface. Further, the pivoting axis is displaced in front of the stop surface for the card, wherein the card is safely guided when the cover is moved from its opening or open position to its closing or closed position.

With the new geometry of the guiding curve formed by the groove it is possible to prevent hindering forces occurring during the opening process in the prior art, said forces might result in a "forceful ejection" of the card out of the cover.

Further, in accordance with the invention the coding chamfer is reduced to minimize the dimension, i.e. the longitudinal dimension.

The invention further provides for the use of a metal cover to minimize the vertical dimension of the SIM-card connector, which is achieved in particular in connection with the attachment of a rivet as a point of rotation for locking. The construction of the components is devised so as an air gap between the SIM-card and the card slot is practically pressed out.

It is an object of the present invention to provide for a SIM-card connector in which good and basically uniform contact pressures are achieved together with a small longitudinal dimension, and, in particular, also together with a small vertical dimension.

To solve this problem, a SIM-card connector is formed in accordance with the invention as set forth in the independent claims. Preferred embodiments of the invention are disclosed in the dependent claims.

BRIEF DESCRIPTION OF THE DRAWING

FIG. 4 is a schematic cross section of the prior art (illustrated in detail in FIG. 9) wherein the movement of the card into the opening position is illustrated;

FIG. 5 is a schematic cross section similar to FIG. 4, however of an embodiment of the invention, wherein again an intermediate position towards the opening position of the cover together with the card is illustrated;

FIG. 6 is a schematic cross sectional representation of the known SIM-card connector of FIG. 4, wherein the manner in which the card together with the cover can be pivoted from an opening position into a closing position is illustrated;

FIG. 7 is a schematic cross sectional view similar to FIG. 5 of the embodiment according to the invention, wherein it is illustrated that the card can be pivoted from the opening or initial position to a closing position together with the cover;

DESCRIPTION OF THE PREFERRED EMBODIMENT

Figure 1:
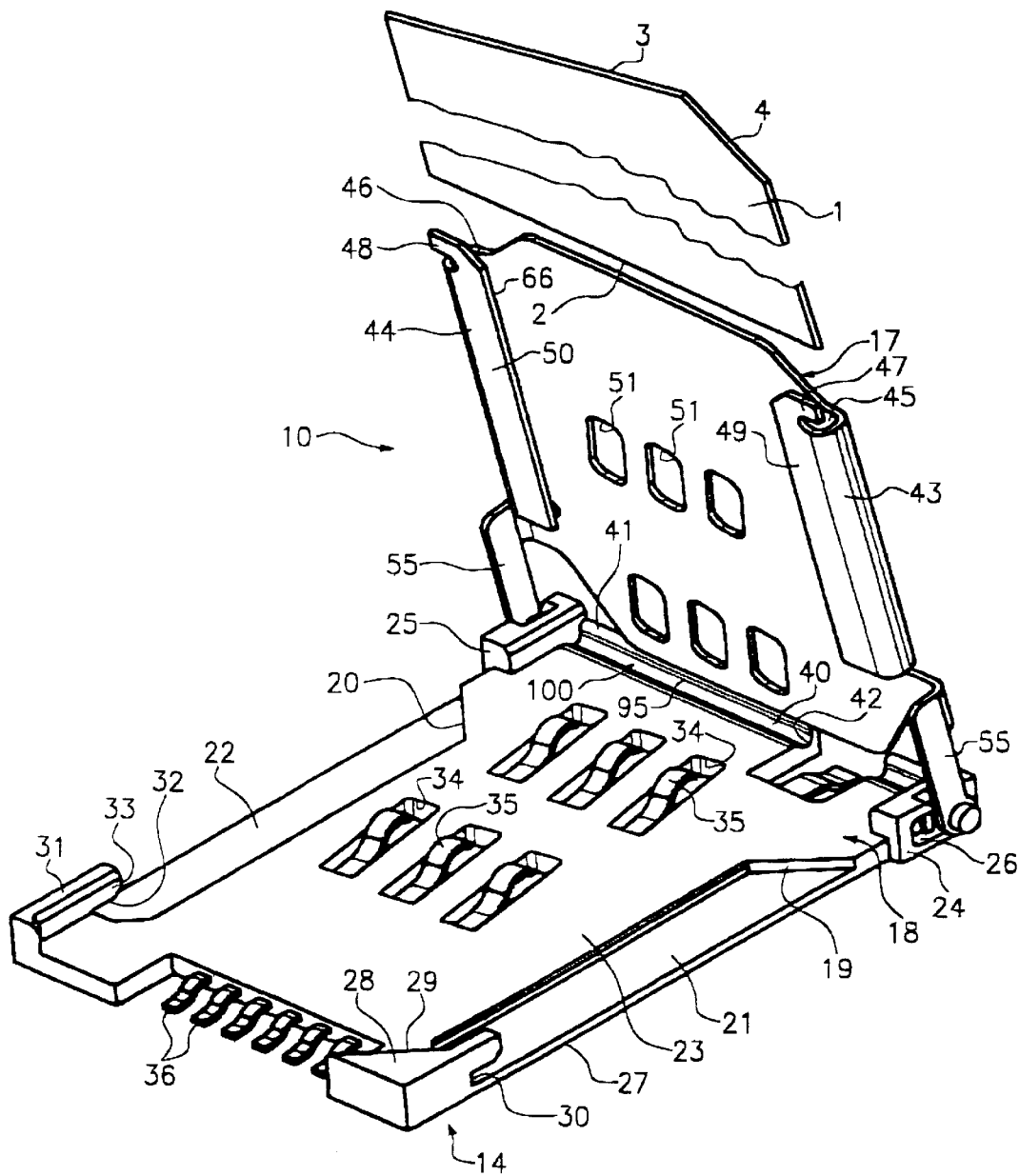
FIG. 1 is a perspective view of a SIM-card connector in accordance with the invention.

FIG. 1 shows a SIM-card connector 10 in accordance with the invention comprising a housing or a contact support 14 and a cover 17 supported on the contact support 14 for pivotal movement. The invention is also applicable, in general, for a smart-card, but is particularly useful for a SIM-card. SIM-cards are frequently used in applications like a cellular or mobile phone, where as a little space as possible should be taken up by the connector 10.

The contact support 14 is preferably panel shaped or in the form of a plate and includes a panel or plate portion 18 with recesses 19, 20 formed on both of its longitudinal sides, said recesses forming cut outs for lateral guidance of the cover 17. Surfaces 21, 22 formed by the recesses 19, 20 may be provided also only partly across the recesses 19, 20, or they may be omitted completely. The panel portion 18 forms a card support surface 23.

At one end of the contact support 14, also referred to as rear end of the contact support 14, supporting or bearing blocks 24 and 25 are formed integrally on both sides from the plastic material which is also used for the panel portion 18.

In accordance with the invention the cover 17 is made from metal, preferably from sheet metal, and is pivotally mounted on the contact support 14 made of plastic material.

Openings 26 (only one of which is shown in FIG. 1) are formed in the supporting blocks 24, 25, said openings 26 have the function to receive hinge means 56 (see FIG. 2) provided on arms 55 of the cover 17, yet to be described.

The contact support 14 comprises a bottom surface 27 with which the connector 10 may be placed, in use, on a part of a device, e.g. a mobile phone. At the front end of the contact support 14 a stop or abutment means 28 with an inclined surface 29 (a so called front abutment means) is provided in such a manner so as to form a locking slot 30 which may cooperate with the cover 17. The inclined surface 29 is also referred to as polarizing surface. It functions to ensure that the card 1 is inserted with the correct orientation.

Opposite to the stop 28 on the other longitudinal side of the contact support 14 also on its front end, there is formed a block 31 having a slot 32 for receiving a locking tab 48. The block 31 further forms a stop or abutment surface 33 for the front side edge of the SIM-card 1.

Further, the contact support 14 has slots 34 formed therein through which the ends of contacts or contact elements 35 project, said contacts are molded into the panel portion 18, for example, and have contacting or terminal ends 36. The contacting ends 36 terminate in a recess in the contact support 14 within the outline or periphery of the inserted card.

Preferably the panel portion 18 has a transverse portion 100 formed integrally therewith which extends preferably between the two supporting blocks 24, 25.

The transverse portion 100 forms card end edge engagement means since the SIM-card 1 inserted into the cover 17 engages with its edge, referred to as rear edge 2, the end edge engagement means which guide the card 1 during the pivotal movement of the cover 17. Opposite to the rear edge 2 the card 1 has a front edge 3 as well as an inclined edge (polarizing inclination) 4.

Figure 8:
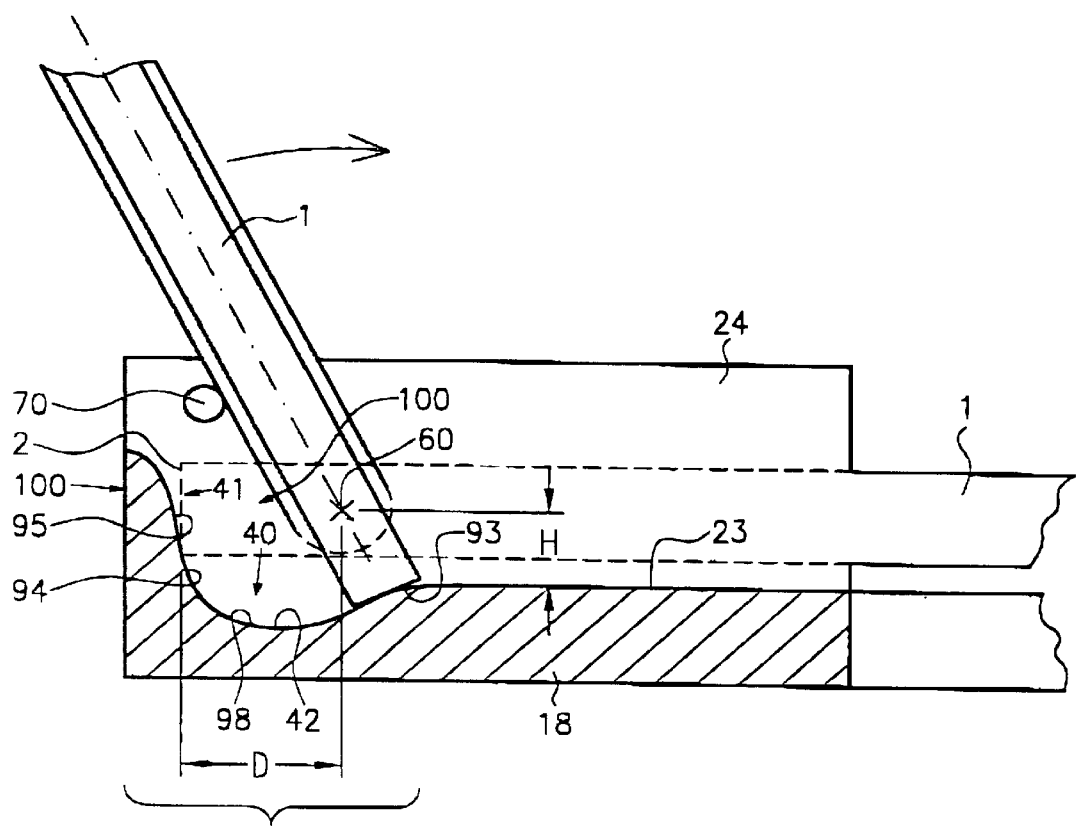
FIG. 8 is a detail of FIG. 7.

Specifically, the end edge engagement means 100, briefly referred to as the transverse portion 100, comprise a recess or groove 40 in the panel portion 18. This recess 40 may be referred to as an engaging or guiding means 40. As shown in FIGS. 5, 7 and 8, when the cover 17 is pivoted together with the card 1, the rear edge 2 engages the surface of the groove 40, which thus guides the card 1. The groove 40 forms so to say a guiding or roll off curve 42.

Figure 2:
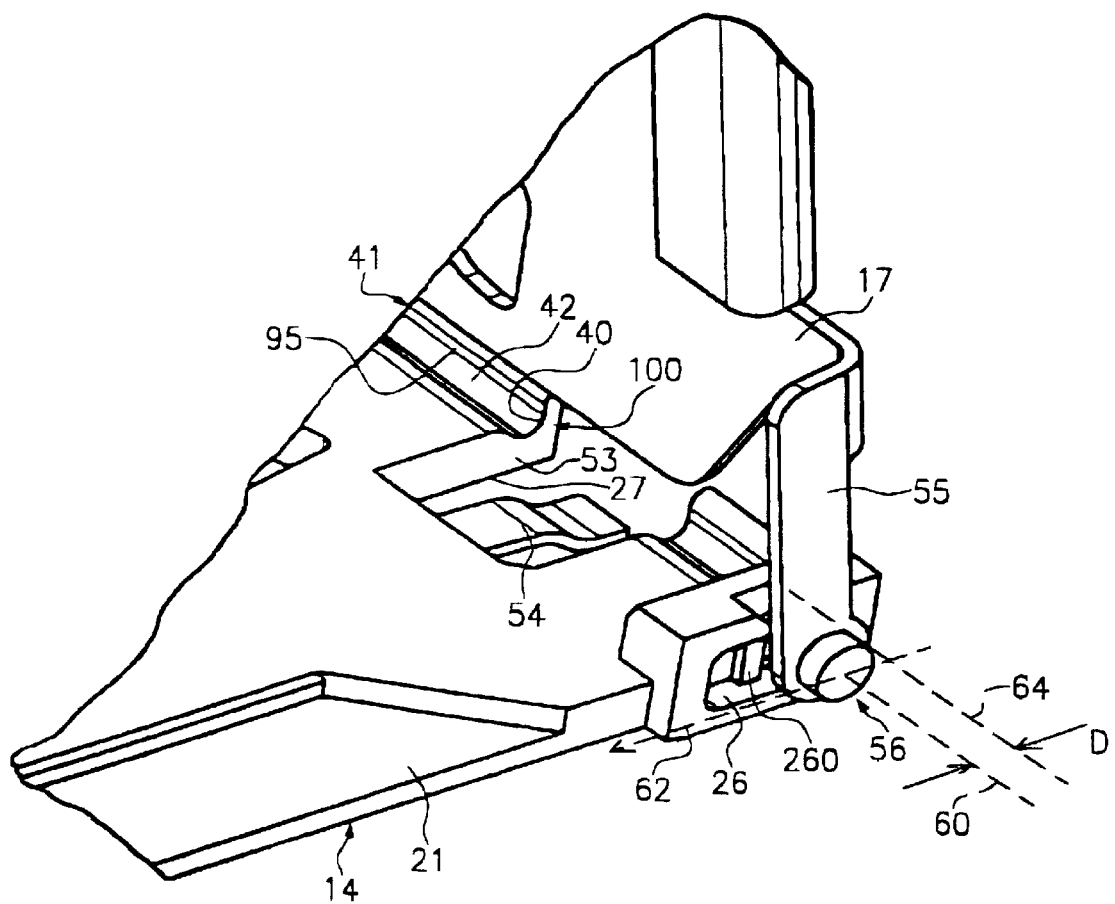
FIG. 2 is an enlarged detail of FIG. 1.

As shown in FIG. 2, the end edge engagement means (briefly the transverse portion) 100 further forms a web 41, which may be referred to as abutment or stop and guiding means 41. In the closing and locking positions, yet to be described, of the SIM-card connector 10 the card 1 (i.e. illustrated in dotted lines in FIG. 8) engages this web 41 forming an abutment surface 95, and it is guided to some extent by the web 41. The web 41 thus forms the abutment surface 95 for the rear edge 2 both in the closing and the locking position of the cover 17. The abutment surface 95 may also be referred to as a rear abutment means (in contrast to the front abutment means 29).

Further, there maybe provided at or on the contact support 14 a stop or abutment 70 (FIG. 7), in particular on one or both of the supporting blocks 24, 25, to define the insertion position for the card 1 into the cover 17.

Referring to FIGS. 1 and 2 it is shown that the metal cover 17 has a planar surface portion having an extended or large area corresponding approximately to the area of the SIM-card, and it comprises side portions 43 and 44 (also referred to as receiving means) on its longitudinal edges. Said side portions form slots 45 and 46 for receiving the card 1. At the front end of the cover 17, on both ends, locking tabs 47, 48 are formed from the sheet metal forming the cover 17 and the side portions 43, 44. Said locking tabs protect through or engage the slots 30 and 32 of the contact support 14 when locking the cover 17. The side portions 43, 44 have formed thereon surfaces 49 and 50, respectively, which immerse or are received into the recesses 19, 20, and which may extend parallel to the surfaces 21, 22. In this manner the vertical dimension of the SIM-card connector 10 is reduced. The side portions 43, 44 have further formed, see FIG. 1, supporting surfaces 66 (only one of which is shown in FIG. 1) for the SIM-card 1. The cover 17 is provided with openings 51 which are located adjacent to the contacts or contact elements in the contact support 14 or the contact portions thereof when the cover 17 is closed.

FIG. 2 shows in detail the construction of the lower or bottom part of the cover 17 and the rear portion of the contact support 14. One notices a cut out 53 in the contact support 14 in which one end of a retaining element 54 projects which is soldered e.g. to a printed circuit board. This is done similarly to the soldering of the contact elements on the opposite side of the contact support so as to securely fix the connector 10 on both sides on said printed circuit board. The cut out 53 is located within the periphery or outline of the card 1 being placed in a reading position.

Figure 3:
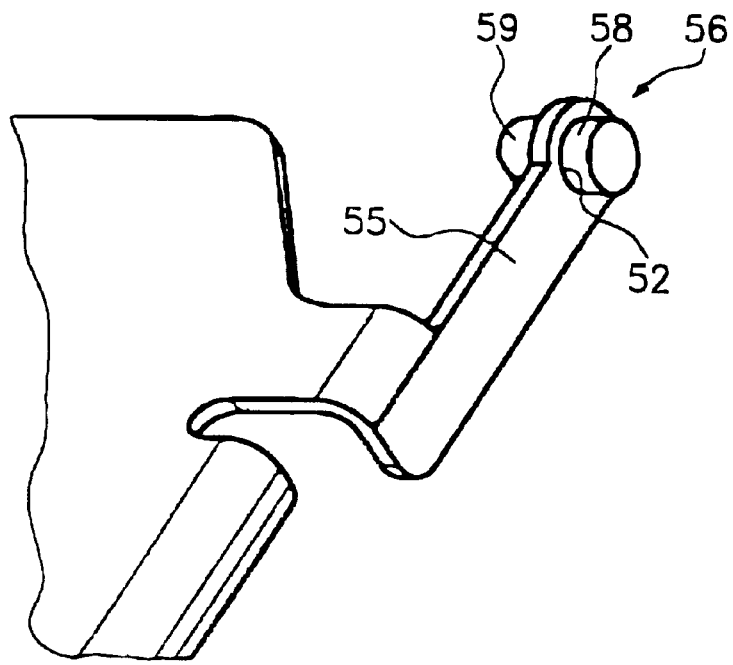
FIG. 3 is an enlarged detail of FIG. 2.
Figure 3A:
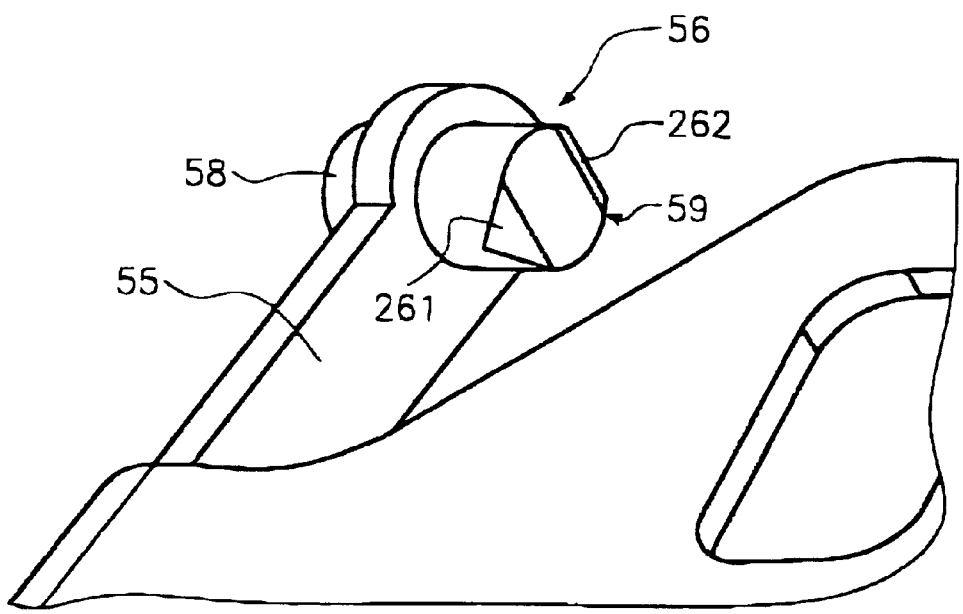
FIG. 3A is an enlarged detail of FIG. 1.

FIG. 2 further shows one of the two arms 55 integrally formed with the cover 17 and forming the hinge means 56 at the lower or bottom end, said hinge means are illustrated in greater detail in FIGS. 3 and 3A. The hinge means 56 each comprises a head 58 as well as a guiding nut or guiding projection 59. The hinge means 56 may also comprise, as shown, a rivet as the point of rotation for locking. In the shown embodiment, the hinge means 56 is a rivet which is inserted with its head 58 into a bore 52 and which is riveted therein. The stem extending from the head 58 forms, see FIG. 3A, the guiding nut 59. A stem is chamfered on both sides of its free end. The chamfers 261 and 262 are located opposite to each other with reference to the direction or the extent of the arms 55, and they facilitate the longitudinal displacement in and opposite to the direction of the arrow 62 (FIG. 2) by means of a cam or a shoulder 260 in the opening 26. The cam 260 divides the opening 26 in two sections. The rotational or pivoting axis for the cover 17 is also seen in FIG. 2 indicated at 60 with a dotted line. The cover 17 (together with the card 1) in its closing position is pivoted around the pivoting axis 60 to be then pushed or displaced from its closing position in the longitudinal direction, indicated with reference numeral 62 in FIG. 2, into its locking position. It is also possible, not to construct the cover 17 being pushable in a longitudinal direction. Preferably, in this case other cover locking means are employed.

Further, as one can see in FIG. 2, the pivotal axis 60 is also displaced in the longitudinal direction 62 "towards the front" (towards the left) with regard to the location of the abutment surface 95 indicated by the line 64.

In particular with reference to FIG. 8, in addition to the displacement of the point at rotation or the pivoting axis 60 in comparison to the pivoting axis 65 of the prior art (see FIG. 9), it will be now referred to the design of the end edge engagement means 100. FIG. 8 shows that the recess 40 (the abutment or guiding means for the rear edge 2 of the card 1) cuts into the panel portion 18 approximately at a starting point or starting line 93, and then forms the guiding or roll off curve 42 which is selected corresponding to the location of pivoting point 60. In the shown embodiment the roll off curve 42 initially falls with a slow inclination to the lowest or deepest point 98 and then rises with a higher inclination towards the end point 94 which is positioned at the height of the supporting surface 23 of the panel portion 18. From there the roll off curve 42 continuously merges into the abutment and guiding means 41 in the area of the web 41 formimg the already mentioned abutment surface 95 (also referred to as rear abutment means) for the rear edge 2 of the card 1.

FIGS. 4 to 7 illustrate the significant reduction of the longitudinal dimension obtained by the displacement of the point of rotation according to the invention. In the depicted embodiment a reduction of the longitudinal dimension from 27 mm (FIGS. 4 and 6) down to 25.5 mm (FIGS. 5 and 7) is achieved.

Figure 9:
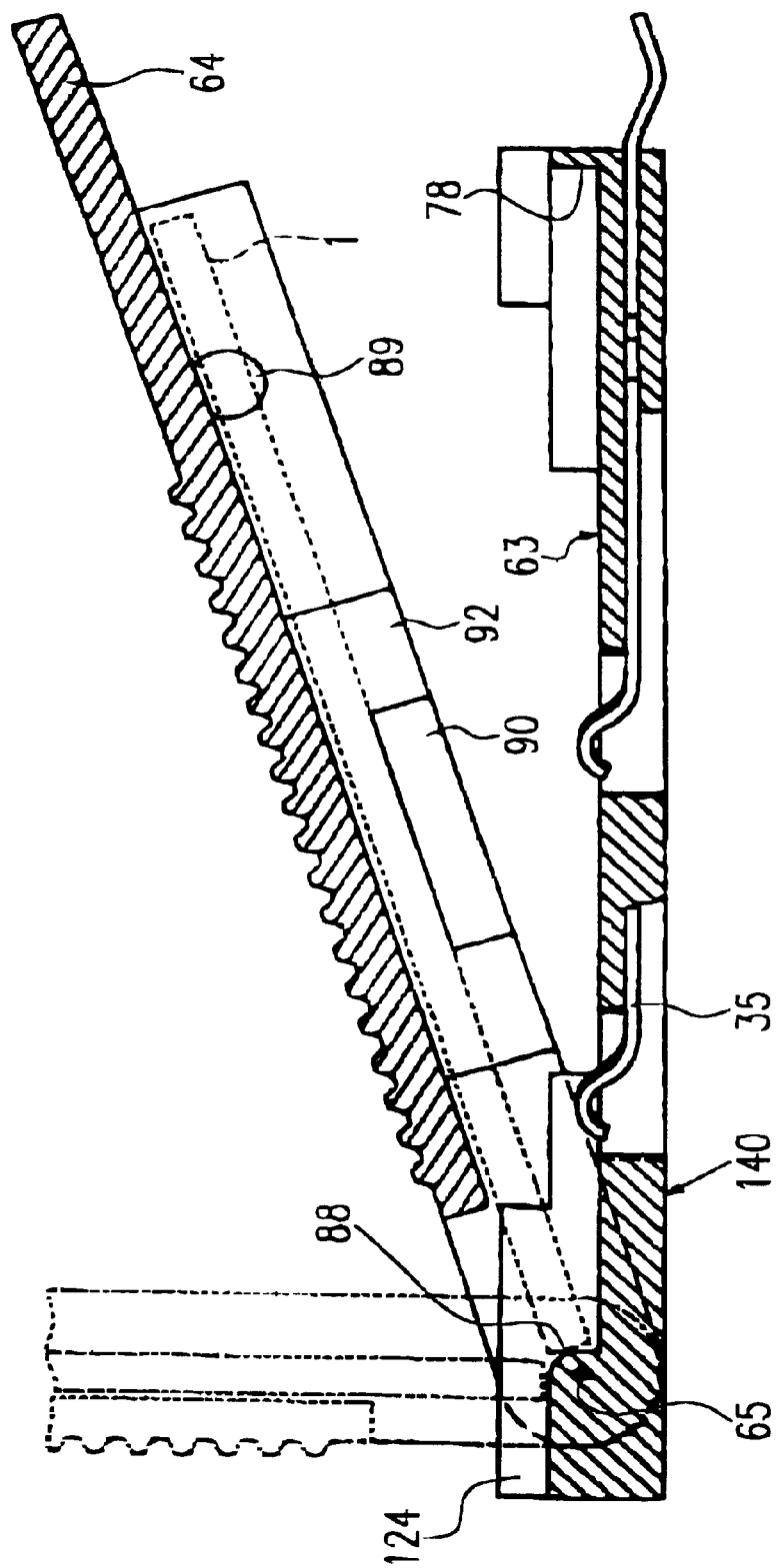
FIG. 9 is a cross sectional view of a known SIM-card connector in accordance with DE OS 40 08 655.

The operation of the SIM-card connector 10 in accordance with the invention is similar to the prior art as referred to in the FIGS. 4, 6 and 9. The SIM-card 1 is inserted (when the cover 17 is open; FIG. 1) into the slots 45, 46 with the rear edge 2 leading, and then the card 1 engages with its rear edge 2 the end edge engagement means 100 (i.e. the transverse portion 100). Then the cover 17 and the card 1 (see now FIG. 7) are pivoted towards the right, whereby the rear edge 2 follows the roll off curve 42. Finally cover 17 reaches the closing position indicated in FIGS. 5 and 7 with the card 1 in dotted lines. In the closing position the card abuts with its rear edge 2 at the abutment surface 95 and with its front edge at the front abutment means 29. Then the cover 17 is (preferably) pushed or displaced into the longitudinal direction 62 (FIG. 2) towards the front (in its pressed down position) until the locking tabs 47, 48 of the cover 17 engage the slots 30, 32 thus locking the cover 17. Instead of displacing the whole cover 17 it is possible to displace parts of the cover as a sort of a sledge in the longitudinal direction.

What is claimed is:

1. SIM-card connector having a cover disposed on a contact support for pivotal movement about a pivoting axis, wherein said pivoting axis is displaced towards the front to reduce the longitudinal dimension and a guiding means recessed in the contact support is provided, wherein the cover is provided with openings which are located adjacent to contacts or contact elements in said contact support when the cover is closed.

2. SIM-card connector comprising:
   a contact support having contact elements or contacts disposed therein,
   a cover which has receiving means for receiving a SIM-card, and which is disposed on the contact support for pivotal movement about a pivoting position or axis together with said card from an open position into a closed position in which said card with its front edge abuts front abutment means, and with its rear edge abuts rear abutment means,
   end edge engagement means for the rear edge of the card formed on the contact support to guide said card when moving the cover from its open position into its closed position and to bring said card into engagement,
   wherein the end edge engagement means form an abutment surface thereon at which the rear edge of the card abuts in the closed position and in a locking position,
   wherein the pivoting axis is disposed, in a longitudinal direction, in front of the abutment surface towards the front abutment means, and
   wherein the end edge engagement means comprise a recess which extends below the card supporting surface, said recess forming a guiding means for the rear edge.

3. SIM-card connector as set forth in claim 2 wherein a transverse portion is provided which has formed said abutment surface thereon and, adjoining thereto, has said guiding means which continuously merges into the card supporting surface.

4. SIM-card connector as set forth in claim 2, wherein the cover or parts of the cover may be pushed or displaced in a longitudinal direction from the closed position into a locking position.

5. SIM-card connector as set forth in claim 2, wherein further a stop or abutment is provided.

6. SIM-card connector as set forth in claim 2, wherein the cover or parts of the same are movable into said locking position for locking.

7. SIM-card connector as set forth in claim 2, wherein the cover is provided with openings which are located adjacent to the contacts or contact elements in said contact support or the contact portions thereof when the cover is closed.

8. SIM-card connector as set forth in claim 2, wherein terminal ends of the contact elements terminate or end in a cut out or recess of the contact support.

9. SIM-card connector as set forth in claim 8, wherein terminal ends of the contact elements terminate or end in a cut out or recess of the contact support within the periphery of said card being placed in its reading position.

10. SIM-card connector as set forth in claim 2, wherein a retaining element projects into a cut out or recess.

11. SIM-card connector as set forth in claim 10, wherein a retaining element opposite to the contact elements projects into a cut or recess within the periphery of said card being placed in its reading position.

12. SIM-card connector as set forth in claim 2, wherein the cover, when pivoted in its closed position, is locked by a snap lock.

13. SIM-card connector as set forth in claim 2, wherein the terminal ends of the contact elements terminate in a cut out or recess of the contact support within the periphery of said card being placed in its reading position.

14. SIM-card connector as set forth in claim 13, wherein the retaining element, opposite to the contact elements, projects into a cut out or recess within the periphery of said card being placed in its reading position.

15. SIM-card connector as set forth in claim 2, wherein the cover comprises turned over or wrapped around side portions forming the receiving means for the SIM-card.

16. SIM-card connector as set forth in claim 15, wherein the side portions comprise locking tabs for the cooperation with slots of the contact support.

17. SIM-card connector as set forth in claim 15, wherein the side portions form supporting surfaces for the SIM-card.

18. SIM-card connector as set forth in claim 2, wherein the cover is made integrally from one piece of sheet metal including the receiving means for the SIM-card and including hinge means for the attachment at or on said contact support.

19. SIM-card connector as set forth in claim 18, wherein additional hinge means are provided on arms of the cover made from sheet metal.

20. SIM-card connector as set forth in claim 19, wherein the hinge means which are additionally provided on the cover have formed chamfers on a guiding nut thereof.

21. SIM-card connector as set forth in claim 20, wherein the hinge means comprise a rivet which is riveted with its head in a bore of the cover, wherein the free end of the rivet oppositely located of the head comprises said oppositely located chamfers which are adapted for cooperating with a cam in an opening of the contact support, wherein the cam divides said opening into two sections.

\* \* \* \* \*